April 5, 1966 H. I. HOFFMAN 3,244,973
MAGNETIC INSPECTION METHOD
Filed May 23, 1963
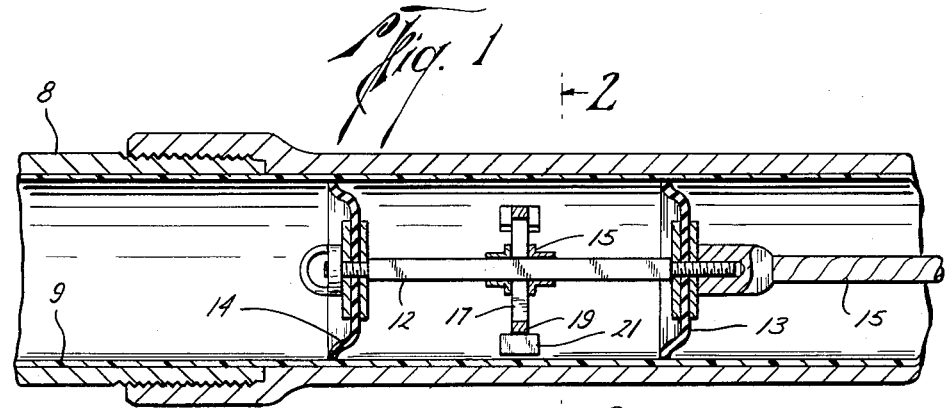
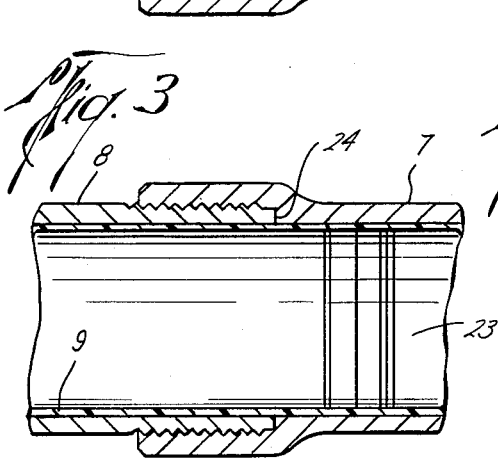
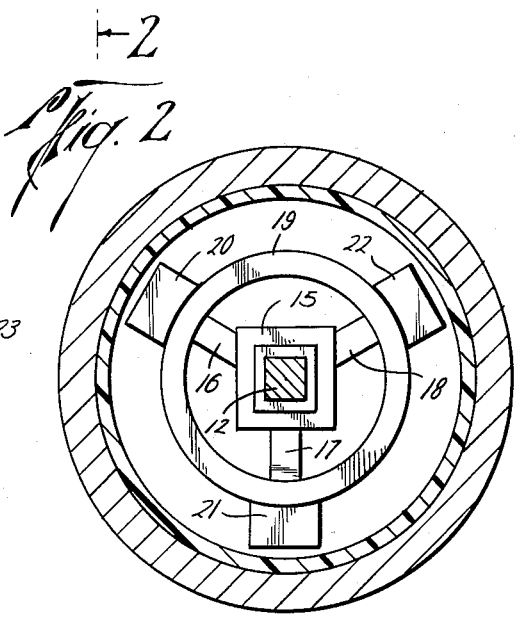
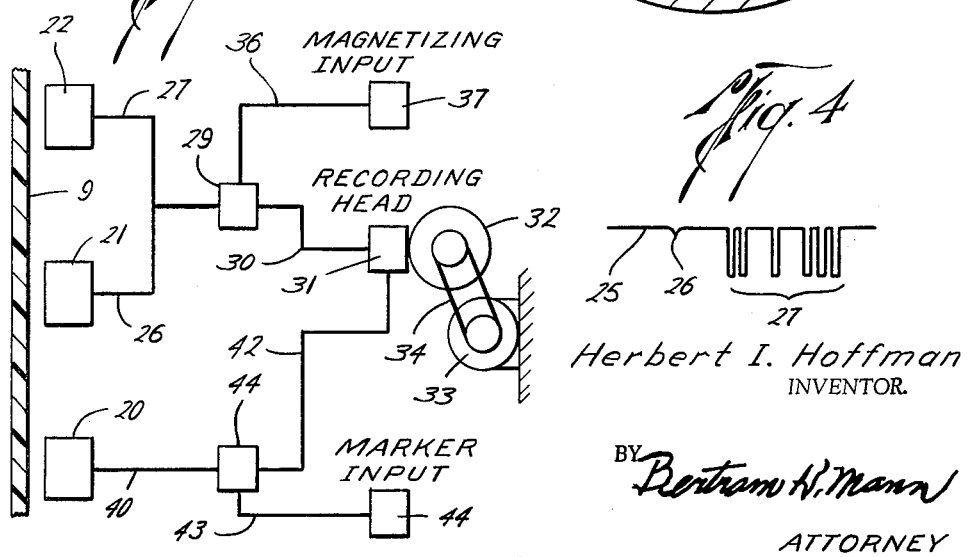
Herbert I. Hoffman
INVENTOR.
BY Bertram H. Mann
ATTORNEY

United States Patent Office 3,244,973
Patented Apr. 5, 1966

3,244,973
MAGNETIC INSPECTION METHOD
Herbert I. Hoffman, San Antonio, Tex., assignor to Southwest Research Institute, Bexar County, Tex., a trust estate under the laws of Texas
Filed May 23, 1963, Ser. No. 282,749
5 Claims. (Cl. 324—38)

This invention relates to methods of inspecting surfaces, particularly those remotely located, such as the inner coating of a pipe, and of locating and identifying specific areas thereof.

Pipe sections prepared for installation in a pipeline often are coated internally and externally to prevent corrosion. Internal coating, as of resinous material, serves the additional purpose of providing a permanently smooth surface to maintain the flow efficiency of the pipeline. Whether the pipe is to be internally coated joint by joint before being welded into a pipeline, or whether the coating is applied internally after the pipe is in place, it is desirable to inspect the coating occasionally to verify that it has not fallen or worn off and to check its protective characteristics, i.e. thickness and continuity.

It is particularly of interest to be able to inspect the continuity of in-place internal coatings, since they are commonly applied over many miles of pipeline in one operation and it is not possible to visually inspect the applied film to assure a proper application. Because of the complexities of long distance internal coating inspection and, particularly, because of possible foreign particles and residual oils and waves, conventional film continuity checkers have not been successful for internal pipeline inspection. Furthermore, no convenient and reliable means is available for exactly locating discovered imperfections or other features in the coating so that corrective measures can be taken.

Accordingly, an object of the present invention is to provide accurate and reliable means for inspection remote surface, such as an internal pipe coating or lining.

Another object is to provide means for identifying imperfections or other surface characteristics, for instance, the location of joints by means of an internal inspection.

Another object is to provide means for accurately signaling the location of surface features which means may be used in conjunction with other surface inspection and scanning procedures to accurately identify the location of specific surface features.

Still another object is to provide a novel magnetizable coating which is magnetically durable, namely, cannot be to readily demagnetized or erased, and which, when magnetized, will be magnetically distinctive even on a magnetic base such as steel.

These objects and others hereafter appearing are attained in general by applying to the surface to be inspected a film or coating of non-magnetic protective material having dispersed therein a finely divided magnetic material, preferably, iron or iron-cobalt powder having sub-micron particles on the order of .02 micron in diameter and in which the individual particles form single domain or elemental magnets. The entire surface coating, as the internal coating of a pipe, may be magnetized and/or coded markers may be located at known zones of the surface. Thereafter, a magnetic pick-up head is caused to scan the surface so as to create electrical currents which are reflective of the condition of the surface, such as the continuity and thickness of the coating. Where coated markers are used, imperfections in the coating can be readily located for correction thereof.

In the accompanying drawings which illustrate the invention,

FIG. 1 is a longitudinal section through a fragment of a pipeline having a pig therein carrying an exemplary form of the novel inspection equipment.

FIG. 2 is a vertical transverse section taken substantially on line 2—2 of FIG. 1.

FIG. 3 is a schematic representation of a digital marker applied to the internal coating of a pipe.

FIG. 4 represents a log made from the coded pipe coating of FIG. 3.

FIG. 5 shows schematically an electrical wiring diagram applicable to the equipment of FIGS. 1 and 2 for carrying out the novel method.

In FIG. 1 there are shown coupled pipe sections 7 and 8 having a continuous internal coating 9. Any coating of non-magnetic material having the desired physical and chemical properties may be used. Epoxy paint is now widely used for this purpose in pipelines for hydrocarbon. Before applications of the coating to the pipe and while the coating material is in the plastic state, there is evenly dispersed therein a magnetic powder, preferably an iron or iron-cobalt powder with sub-micron particles on the order of .02 micron in diameter. Two magnetic powders have been used in epoxy coatings for the purpose. They are (1) sub-micron iron powder from National Research Corporation, Cambridge, Massachusetts, and (2) Lodex 55 iron-cobalt powder in resin from General Electric Company, Products Engineering, Edmore, Michigan.

After application of the novel magnetic coating, it is permanently magnetized before curing. Preferably, the entire surface coating will be magnetized. However, it is contemplated that less than the entire surface may be magnetized, for particular results as, for instance, where 100% inspection is not necessary or for marker purposes as will be described hereafter.

There is also shown in FIG. 1 a wiping plug or pig consisting of a central longitudinal bar 12 having flexible plunger caps 13 and 14 secured to opposite ends thereof and of a size and shape to closely fit the internal surface to be inspected. The pig may be forced through the pipe by differential fluid pressure on its opposite faces. However, there is illustrated in FIG. 1 a cable 15 projecting rightwardly from the pig which may be used to draw the pig through the pipe and also which may carry conductor wires leading to the magnetizing and/or pickup (playback) heads.

Projecting radially from center bar 12 and secured thereto by a yoke 15 are arms 16, 17 and 18 which support a concentric ring 19. Mounted on the outer surfaces of the ring at equally spaced intervals are the magnetizing and/or pick-up heads 20, 21 and 22 which are disposed to magnetically scan the inner surface of the coating. If desired, positive rotational means such as an electric motor drive at yoke 15 may be provided for causing the pig to rotate in its transit through the pipe. Thus, if the axial motion of the pig is properly adjusted with respect to its rotary motion, one hundred percent scanning of the inner surface of the pipe may be achieved.

FIG. 3 represents a digital coded marker 23 applied transversely to the pipeline coating adjacent the joint 24, in this case. The marker, of course, will be properly coded so as to indicate on the record the exact location of the marked area.

FIG. 4 shows a log made from the inner surface of a pipe, as in FIG. 3. By way of illustration the log includes a straight line portion 25, a slight dipped portion 26 which may indicate a joint line 24 in the coating, and the coded configuration 27 resulting from the marker 23. The coding will be such as to closely identify to the trained observer or to a computer the location of a surface feature, as 24, producting the log line features 26. Where the pickup heads 20, 21 and 22 travel longitudinally along the surface, the markers may be annularly separated so as to more closely indicate the marked area.

FIG. 5 shows schematically a wiring diagram applicable to the equipment shown in FIGS. 1 and 2. The heads 21 and 22 are shown connected by wires 26 and 27 to a conventional switching instrumentality 29 which is connected by a wire 30 to a recording head 31 operatively positioned with respect to a spool 32 carrying magnetic recording tape and actuated from a motor 33 by a belt 34. Switching box 29 is also connected by a wire 36 to an input device 37 for energizing recording heads 21 and 22 so as to magnetize the coating indicated at 9. If desired, the input signal may be modulated to provide markers, as at 23 in FIG. 3. However, I have shown a separate marker applying and reading head 20 connected by a wire 40 to a switching device 41 which is connected by a wire 42 to recorder head 31 so that the pick-up from all three heads 20, 21 and 22 will be applied to the tape on spool 32. Preferably, head 31 will provide a separate trace on the record for each pick-up head. For applying the markers, I have shown a separate system, including a wire 43 which connects switching box 41 to a coding input device 44. The coding input device 44 and decoding means may be manual or may utilize commercially obtainable computer equipment. For instance, a binary marking system would be especially suitable in the coding operation.

In operation, after the application of the novel magnetic coating to the substrate but before the cure is completed, magnetization may be effected with the use of the novel magnetizing and pickup pig. Coded markers will be applied at known positions. Thereafter, the coating may be inspected for continuity, thickness and other physical properties by again utilizing the pig, with proper switching adjustments of the electrical mechanism, as magnetic pickup or playback means. The visible record made may then be inspected to determine the condition of the coating and by reference to the coded markers the exact positioning of any surface imperfection or marked features.

It is contemplated that the marker feature may be utilized by applying coded magnetized markers at intervals along the inner surface of the pipe, for instance, adjacent joints. Such markers could be utilized in connection with a different kind of surface inspection, for instance, ultrasonic or even impedance measuring type in which magnetic lines of force are projected from an internal or external radiating instrument and then read by a gauss meter or other well-known measuring means. The novel markers, of course, facilitate exact location of discovered surface features or anomalies.

It is also contemplated that the novel markers may be applied to other linear surfaces, such as highways or the floor of an automated warehouse for use in truck guidance. Dirt and paint will not obscure the magnetic markings, as would be the case with optical markings.

The invention may be modified in various respects as will occur to those skilled in the art and the exclusive use of all modifications as come within the scope of the appended claims is contemplated.

I claim:

1. The method of detecting defects in a non-magnetic coating applied to a substrate as protection thereof against corrosion, abrasion, and the like which includes the steps of dispersing a magnetic powder in said coating, permanently magnetizing said coating after application thereof to the surface, scanning the coating with magnetic pickup means to create electric currents, and utilizing said currents to produce signals indicative of the protective characteristics of the coating.

2. The method described in claim 1 in which selected coating areas of known location are magnetized to provide magnetically sensible markers therein for aid in determining the location of nearby coating features magnetically sensed.

3. In the method of inspecting the internal plastic lining of a pipe, the steps of dispersing finely-divided magnetic powder in the lining material, passing a magnetic recording head through the lined pipe to permanently magnetize the lining, passing a pickup head through the magnetized lining to produce electrical currents, and translating said currents into intelligible signals indicative of the characteristics and positioning of scanned areas of the lining.

4. The method of protectively coating and inspecting an extensive, non-compact surface against corrosion, abrasion, and the like which comprises the steps of dispersing a magnetic powder in non-magnetic, fluid, coating material, applying the material to the surface to be protected, permanently magnetizing the applied coating, passing magnetic pickup means along the coated surface to generate electrical currents, utilizing said currents to actuate signal means indicative of protective characteristics of areas of said coating being scanned by said pickup means, and determining the locations of said areas.

5. The method described in claim 4 in which coating areas of predetermined locations are provided with distinctive magnetization as marker means to assist in determining the locations of areas being scanned.

References Cited by the Examiner

UNITED STATES PATENTS

| 2,989,735 | 6/1961 | Gumpertz | 324—41 |
| 3,026,215 | 3/1962 | Fukuda | 179—100.2 |
| 3,052,567 | 9/1962 | Gabor | 179—100.2 |

OTHER REFERENCES

"Magnetic Tape Tester," by Don Wherry, Radio-Electronics, pp. 52–54, November 1962.

RICHARD B. WILKINSON, *Primary Examiner.*

WALTER L. CARLSON, *Examiner.*

F. A. SEEMAR, *Assistant Examiner.*